United States Patent [19]

Colombo

[11] Patent Number: 5,229,029

[45] Date of Patent: Jul. 20, 1993

[54] PROCESS FOR THE MANUFACTURE OF AQUEOUS SOLUTIONS OF ANTI-SCALING AGENTS AND THUS OBTAINED SOLUTIONS

[75] Inventor: Paolo Colombo, Varese, Italy

[73] Assignee: Ausidet S.R.L., Italy

[21] Appl. No.: 500,957

[22] Filed: Mar. 29, 1990

[30] Foreign Application Priority Data

Oct. 25, 1989 [IT] Italy .................... 22135/A

[51] Int. Cl.$^5$ .................... C02F 5/10; C07C 1/24; C08F 210/04

[52] U.S. Cl. .................... 252/180; 526/271; 526/272; 252/181; 252/82; 252/DIG. 2; 252/DIG. 11; 210/700

[58] Field of Search .......... 252/180, 181, 82, DIG. 2, 252/DIG. 11; 210/698, 699, 700, 701; 526/271, 272

[56] References Cited

U.S. PATENT DOCUMENTS

| | | | |
|---|---|---|---|
| 3,623,991 | 11/1971 | Sabatelli et al. | 252/180 |
| 3,887,480 | 6/1975 | Rue et al. | 252/99 |
| 4,065,607 | 12/1977 | Kurowsky | 252/180 |
| 4,126,549 | 11/1978 | Jones et al. | 252/180 |
| 4,223,120 | 9/1980 | Kurowsky | 252/180 |
| 4,253,968 | 3/1981 | Eastman | 210/698 |
| 4,913,823 | 4/1990 | Lipinski et al. | 252/180 |
| 4,929,425 | 5/1990 | Hoots et al. | 252/180 |
| 4,944,885 | 7/1990 | Chen | 210/701 |
| 4,978,465 | 12/1990 | Sprague | 210/699 |

FOREIGN PATENT DOCUMENTS 78501 3/1982 Romania .

OTHER PUBLICATIONS

Chem Ab 101:216173k, Xu et al. "Synthesis of Maleic Anhydride-Vinyl Acetate-Acrylate Copolymer and Its Efficiency for Scale Inhibition", 1983.
Chem Ab 103: 128720x, Iosifescu et al. "Inhibition of the Deposition of Calcium Carbonate Scale From Geothermal Waters by Anionic Polyelectrolytes" 1984.
Chem Ab 105: 29708j, Shen "Synthesis of Maleic Anhydride-Vinyl Acetate-Acrylolectrile Water Soluble Copolymer as a Scale Inhibiting Agent", 1986.
Chem Ab 111:201306p, Shen et al. "Study and Synthesis of a New Style Scale Inhibitor" 1988.

Primary Examiner—Prince Willis, Jr.
Assistant Examiner—J. M. Silbermann
Attorney, Agent, or Firm—Morgan & Finnegan

[57] ABSTRACT

A process for the manufacture of aqueous solutions of anti-scaling agents, starting from maleic anhydride and vinyl acetate (and optionally from a third monomer), characterized in that:
(A) the amount of vinyl acetate ranges from 40 to 70% by moles, with respect to the sum of all the comonomers, the amount of maleic anhydride ranges from 30 to 50% by moles, with respect to said sum, and the amount of termonomer ranges from 0 to 30% by moles, with respect to said sum, the molar ratio vinyl acetate/maleic anhydride being equal to or higher than 1;
(B) maleic anhydride, vinyl acetate (and optionally said third monomer) are co-polymerized in an organic diluent having medium or low polarity;
(C) the anhydrous suspension, obtained according to (B), is directly subjected to a reactive extraction with water.

17 Claims, 2 Drawing Sheets

PROCESS FOR THE MANUFACTURE OF AQUEOUS SOLUTIONS OF ANTI-SCALING AGENTS AND THUS OBTAINED SOLUTIONS

BACKGROUND OF THE INVENTION

1. Field of the Invention:

The invention relates to a process for the manufacture of aqueous solutions of anti-scaling agents, which show a high binding capacity, with respect to calcium and magnesium ions, and which can be advantageously used in the field of detergency.

2. The State of the Art

The action of the sequestering agents in the presence of drinking water, or of untreated industrial water, is well known; these agents, by formation of complexes with polivalent metal ions (for instance alkaline-earth metal ions, which form the water hardness) and even with other heavy ions, hinder the formation of precipitates, thus avoiding the scale (incrustation) deposition, in plants where water is warmed, such as boilers or heat-exchangers, the above mentioned agents hinder, as it is known, the scale formation on the metal surfaces. During home-washing and industrial cleaning, polivalent metal ions may interact with the anions present in the soil and with the anions coming from the detergent. In this case also the scaling (incrustation) action of the mentioned agents on the fabric fibers is known. When control agents are not present, the incrustation would increase the ash content, washing by washing, thus causing undesired matting and grey coloration phenomena.

A compound used for many years, showing an excellent activity against the formation of precipitates and inhibiting the re-deposition of solid particles and soil onto fabrics, is sodium tripolyphosphate. However, it is known that such compound, by degradation in water, gives rise to phosphates, which in turn favor the anomalous growth of algae in inland waters and seas, thus contributing to the phenomenon known as eutrofication and to the consequent reduction (in the most serious cases exhaustion) of the oxygen content in waters, with imaginable ecologic consequences. That is the reason for which in many countries, laws were introduced in order to limit or to forbid the use of sodium tripolyphosphate in detergents. Other coumpounds having a fair complexing and antiprecipitation activity against soil (and insoluble salts) are aminocarboxylic acids. For instance the sodium salts of nitrilotriacetic acid (NTA) and of ethylenediaminotetracetic acid (EDTA) can be mentioned. However, these compounds show some drawbacks, limiting their use, such as the presence of nitrogen in the molecule (nitrogen, in fact, has a role in the eutrofication process). Therefore, their use can be only a restricted use. The reduction of the Na tripolyphosphate contents in detergents has become possible by the use of gradually increasing amonts of Zeolite 4A (a particular sodium aluminosilicate) with substitution ratios higher that 1:1, on sodium tripolyphosphate. In order to get a more effective and complete activity of the detergent formulations having low phosphorus contents, the contemporary presence of other agents, different from zeolite, and/or detergency coadjuvants, showing a particular action, is also requested.

The Applicants have now found a new process for the manufacture of very effective products which do not contain phosphorus nor nitrogen atoms in their structure and which are consisting only of C, H and O atoms, exhibiting a fair effectiveness, so that they can be used as sequestering agents, or generally as coadjuvants, and furthermore as anti-scaling agents in processes involving the heating of drinkable and industrial waters. Furthermore, the new products can be used with great advantage in detergency processes, where the presence of alkaline earth ions, already in the cold, may give rise to the precipitation of insoluble salts, because of the interaction of some components of the detergent or as the result of heating processes, thus forming precipitates typical of the hard waters.

Said new products are aqueous solutions containing copolymers of maleic anhydride and of vinyl acetate, whose structure is simplified in formula (I):

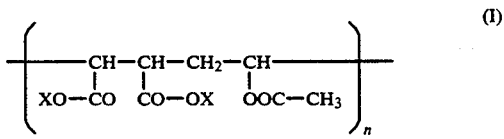

wherein X represents hydrogen and/or a monovalent cation, generally sodium, and wherein n is an index corresponding to the polymerization degree. The copolymer solutions according to the invention are showing quite higher technological properties, compared with the hydrolized or transesterified copolymers, described by British Patent 1385131 or respectively by Italian Patent 20015 A/89, which can be represented substantially by formula (II):

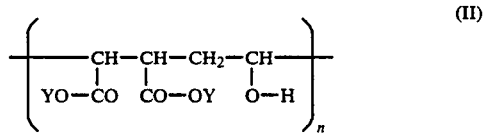

wherein Y can mean:
  Na in the case of "hydrolized" copolymers;
  H and/or $CH_3$ (or another alkyl group) in the case of "transesterified" copolymers.

The "hydrolized" copolymers, obtained by a drastic caustic treatment, retain, as is known, considerable amounts of sodium acetate, a by-product which is useless for the detergency purposes and which represents a weight loss in terms of active substance.

The "transesterified" copolymers do not contain any sodium acetate, but they require a complicated preparation process, based on operations which are not easy in the absence of water.

DISCLOSURE

The invention, in its broadest aspect, relates to a process for the manufacture of aqueous solutions of anti-scaling agents, starting from maleic anhydride and vinyl acetate (and optionally from a third monomer), characterized in that:

(A) the amount of vinyl acetate ranges from 40 to 70% by moles (preferably 45–65%), with respect to the sum of all the comonomers, the amount of maleic anhydride ranges from 30 to 50% by moles, with respect to said sum, and the amount of termonomer ranges from 0 to 30% by moles (preferably from 1 to 10%), with respect to said sum, the molar ratio vinyl acetate/maleic anhydride being equal to or higher than 1;

(B) maleic anhydride, vinyl acetate (and optionally said third monomer) are co-polymerized, optionally in the presence of a protective colloid, in an anhydrous reaction medium, consisting of an organic diluent having medium or low polarity;

(C) the anhydrous suspension obtained according to (B), is directly subjected to a reactive extraction with water;

(D) the organic phase is recycled, after separation of the phases, to stage (B) of the copolymerization;

(E) the aqueous phase is optionally neutralized with an alkaline solution, for instance aqueous NaOH; afterwards it is directly transferred to storage or utilization.

If necessary, the last traces of diluent can be removed, before (or during) neutralization by azeotropic distillation or vacuum evaporation.

Said extraction is defined as "reactive", because Applicant noted that water can open (hydrolyze), during the extraction, the ring of the maleic units; the extraction temperature generally ranges from room temperature to 120° C., preferably from 60° to 120° C. The amount of water, to be used for the extraction, generally ranges from 75 to 500 kg (preferably from 90 to 300 kg) per 100 kg of pure copolymer or terpolymer. The best results are obtained under vigorous stirring (turbulence).

Enclosed FIG. 1 is given merely for illustrative purposes and it does not limit, in any way, the scope of the claimed invention.

Figure 1:
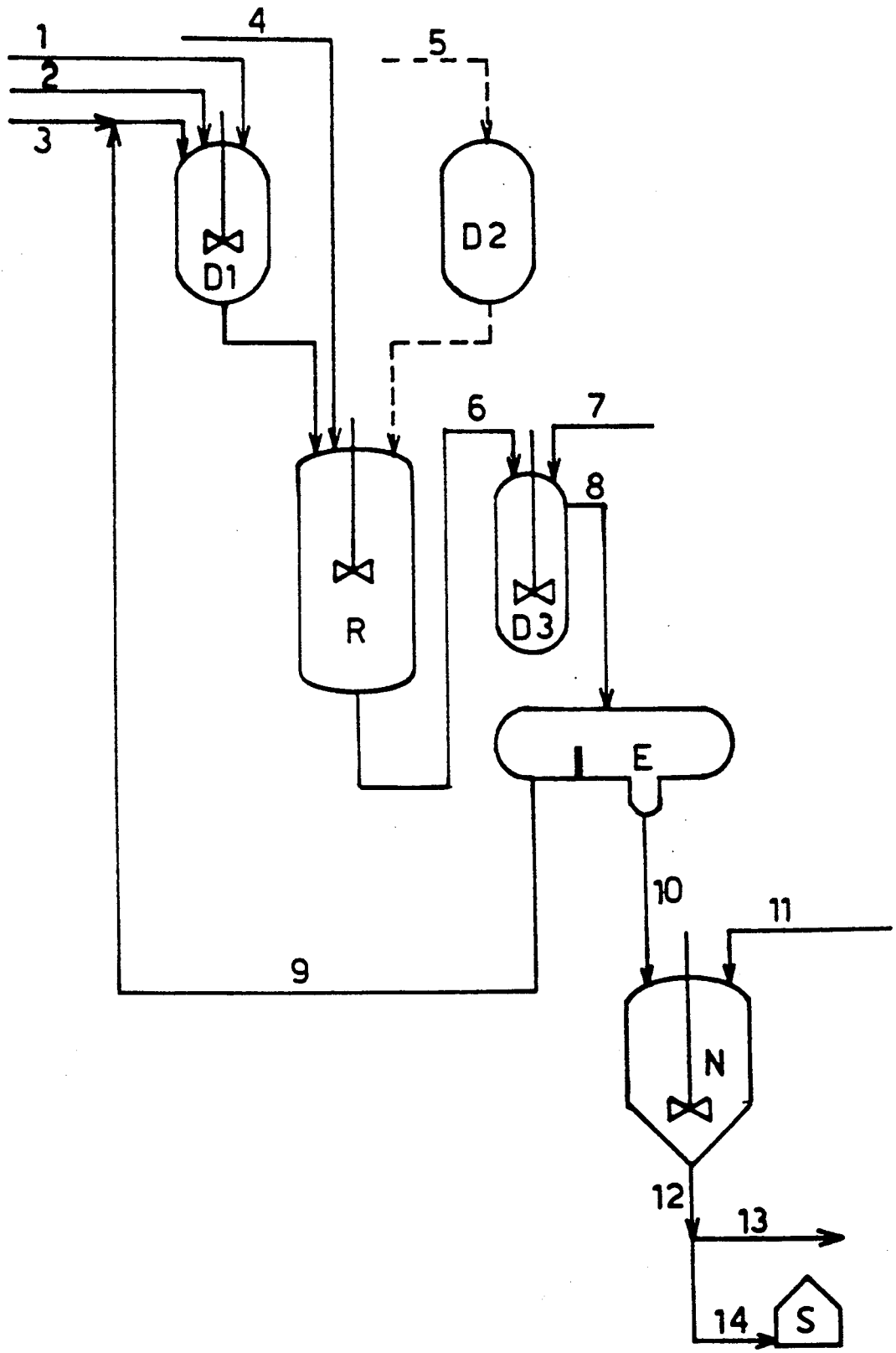
FIG. 1 and FIG. 2 show flow diagrams for the subject process.
Figure 2:
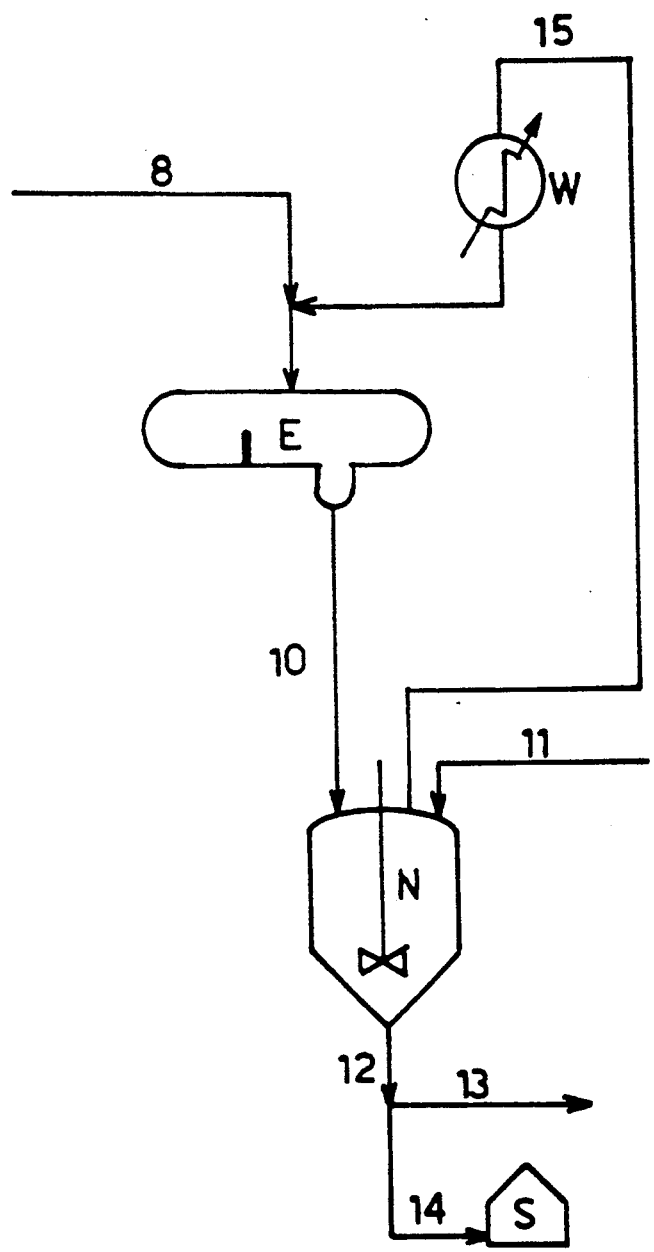

According to said FIG. 1, maleic anhydride (1) and vinyl acetate (2) are mixed, in equimolar amounts, with a diluent (3), for instance toluene, in tank (D1). An adduct is thus obtained, in which the maleic and vinylacetate units are present in equimolar amounts. A second tank (D2) is loaded optionally with a toluenic solution (5) of pure vinyl acetate (and/or of another comonomer), if an increase of the comonomers/maleic anhydride ratio is desired. Then the content of tank (D1) is fed, in a continuous way, to (thermostated) reactor (R), along with a solution (4) of the initiator (for instance azobis-isobutyronitrile) in toluene and optionally with the solution coming from tank (D2), keeping constant the ratios among the different streams. When the feed of the reactants is over, the reactor is kept hot and under stirring a little longer; then the mixture can be cooled and the content (6) of the reactor is directly transferred into the mixer (D3), equipped with a stirrer and fed with a water stream (7). Then biphase system (8) is transferred to tank (E), where the separation of the phases takes place. Organic phase (9) is recycled to tank (D1) and aqueous phase (10) is sent to the neutralization apparatus (N), along with a stream (11) of aqueous NaOH. Then the neutralized solution (12) is directly sent to utilization (line 13) or storage (S) through line (14). If necessary, the last traces of residual diluent can be removed easily, before neutralization, by azeotropic distillation (azeotropic stripping), which is not indicated in the figure. Alternatively, the diluent can be removed by vacuum evaporation, during the neutralization phase, as indicated in FIG. 2. The loss of organic diluent is practically nil, on account of the recycle carried out after the extraction.

The main advantages coming from the invention are briefly listed hereinbelow:

the new process is much easier, if compared to the prior art, and allows to avoid the complicate transesterification reaction, which involves weight losses of starting materials (in the form of methyl acetate);

one avoids the losses of starting materials (in the form of sodium acetate), coming from the drastic caustic treatment, which converts (by hydrolysis) the vinylacetate units into vinylalcohol units;

the calcium binding capacity is higher, if compared to maleic anhydride/vinylalcohol copolymers obtained by hydrolysis with NaOH; therefore the effect of reduction and limitation of the scales on fabrics is much more evident;

the solutions obtained according to the invention, which can be defined "dissolved copolymers" as well, are extremely effective for reaching a high whiteness index in the washing carried out with phosphorus-free detergent solutions.

The invention, as already mentioned, also relates to aqueous solutions of anti-scaling agents, obtained starting from maleic anhydride and vinyl acetate, according to the aforesaid process, having a viscosity (at 20° C.) equal to or lower than 2000 (preferably 800) mPa.s and containing from 40 to 50% by weight of hydrosoluble copolymer or terpolymer, the weight average molecular weight of said copolymer (or terpolymer) ranging:

from 1000 to 35000, in the case of copolymers of maleic anhydride and vinyl acetate;

from 5000 to 60000, in the case of terpolymers of maleic anhydride, vinyl acetate and third monomer, preferably acrylic acid.

The aqueous solutions according to the invention can be used in liquid formulations, requiring both the compatibility (miscibility) of the copolymers with the detergent liquid system and their non-interference with the enzymes, during the storage of the detergent.

The above mentioned formulations may contain anionic, non ionic, amphoteric or zwitterionic surfactants, soaps, builders, solubilizers, enzymes, perfumes, dyestuffs, protective agents and so on. Said solutions can be used in the field of powdery or granular detergent formulations, by addition of same solutions to the conventional suspension (slurry) fed to the spray drying plants.

The powder detergent formulations we are referring to are usually consisting of many components, selected from anionic surfactants (for instance LAS, alphasulfomethylesters, alkylsulfates, alkyl polyethoxysulfates); non-ionic surfactants (for instance ethoxylate alcohols, ethoxylated nonyl-phenols, sugar esters, alkylpolyglucosides etc.); soaps; builders (for instance zeolites, lamellar crystalline silicates, disclosed for instance in the European patent 164,514, citric acid, NTA, sodium carbonate etc.); stabilizers (soluble sodium silicate, EDTA-Na, magnesium silicate etc.); bleaching agents (e.g. sodium perborate mono- and/or tetrahydrate, sodium percarbonate etc.); bleaching activators (PAG, TAED, TAGU, NOFSNA etc.); inhibitors of the grey coloration, such as carboxymethylcellulose (CMC); inorganic salts (for instance $Na_2SO_4$). Other generally used components are optical brighteners, perfumes, colored speckles etc. NOFSNA means nonanoyl-phenolsulfonate (sodium salt).

The amount of copolymer to be used in liquid and powder detergents is generally between 0.5 and 15%, preferably between 1 and 8% b.w. In formulates containing 2.5% by weight of phosphorus, said amount can suitably be from 2 to 3% by weight; in the case of formulations free from phosphorus, the amount has to be a little higher (for instance from 3 to 5% by weight). The amount of copolymer to be added to water, to avoid scale (fouling) is generally from 0.1 to 1.000 ppm and preferably from 1 to 100 ppm.

The copolymers (or terpolymers) present in the solutions according to the invention contain maleic units and vinyl acetate units, which are exactly alternate between each other or copolymers in which small amounts are present of other units derived from other mono-unsaturated termonomers, such as for instance acrylic acid, methacrylic acid, (methyl, butyl, ethyl or hydroxyethyl) acrylates, itaconic acid, methyl-vinyl-ether and vinyl acetate itself. Said copolymers and terpolymers can be obtained according to semicontinuous or continuous reaction, after having prepared an exactly equimolar adduct between maleic anhydride and vinyl acetate, by feeding, in a continuos way, to the reaction system, the thus formed adduct, the optional termonomer and the catalytic system. The introduction (and the amount) of the termonomer affects the complexing properties of the terpolymer, which can be expressed in terms of pKCa (logarithm of the inverse of the dissociation product of the complex), but it does not affect in a meaningful way the dispersing and sequestering capacities, as well as the microstructure of the terpolymer.

The diluent used for the copolymerization must not give rise to interactions with the monomers and with the catalystic system; said diluent must be a solvent for maleic anhydride and/or for its adduct with vinyl acetate, but must be preferably a non-solvent for the successively formed copolymer. Aromatic solvents (such as benzene, toluene, ethylbenzene etc.); cycloaliphatic solvents (cyclohexane etc.); mixtures of aromatic and cycloaliphatic solvents; aliphatic chlorinated solvents (chloroform, dichloroethane, carbon tetrachloride, methylene chloride etc.) can be used. Also low-boiling chlorinated solvents, such as methylchloride, could be used but, under the requested working conditions, it is necessry to work under pressure. During the copolymerization, the formed solid particles remain suspended in the reaction solvent. The co-polymerization temperature is between room temperature and 150° C. (preferably between 50° and 120° C., to avoid working under excessive pressure and to have kinetics suitable for the industrial purposes.

Radical initiatiors for these co- and terpolymerizations are the generally used initiators of radical (solution) polymerizations, such as azoderivatives (in particular azobis-isobutyronitrile); acyl peroxides (such as benzoyl peroxide or lauroyl peroxide and so on); peresters; dialkylperoxides; peroxydicarbonates; hydroxyperoxides and mixtures thereof. The choice of the initiatior is also depending on the reaction temperature, which is in turn controlling the optimum value of the semitransformation time (time necessary for decomposing 50% of the initiator).

When the concentration of the copolymer, in the suspension, is over 25% by weight, it is suitable to operate (in the polymerization phase) in the presence of a protective colloid, in amounts which generally range from 0.02 to 3% by weight (with respect to the copolymer), preferably from 0.05 to 2%. Said protective colloid can be selected, for instance, from polymers and copolymers of alkyl-vinyl-ethers, such as for instance:
poly-methyl-vinyl-ether;
poly-ethyl-vinyl-ether
poly-propyl-vinyl-ether;
poly-isobutyl-vinyl-ether;
copolymers of the alkyl-vinyl-ethers with vinyl acetate, acrylic or methacrylic acid, maleic anhydride, itaconic acid and the like.

Other details can be found in Italian patents 20015 A/89 and 20798 A/89, as well as in European patents 103254 and 106991, whose content is an integrant part of the present disclosure. The alternate and regular arrangement of the comonomers (in the structure of the copolymers) is important for obtaining good dispersing and complexing properties.

As to the methods used for the determination of the parameters mentioned in the examples, we go further into details as follows:
calcium binding capacity (mg of $CaCO_3$ per gram of dry copolymer): HAMPSHIRE TEST, mentioned in German Patent 1,904,941, corresponding to UK Patent 1,296,413;
dispersing capacity: BASF METHOD described in a paper by F. RICHTER and E. W. WINKLER on TENSIDE, SURFACTANTS AND DETERGENTS, 24(4); page 213 (1987);
"threshold inhibition" or "crystal modification"; see the paper by G. Mc Grew published on CHIMICA OGGI (1986); No. 10; page 57;
complexing capacity; the determination of the chelating properties was carried out using a calcium ion $(Ca^{++})$ selective electrode, as described in ANALYTICAL LETTERS vol. 4(10); pp. 653-663 (1971).

The following examples are supplied for merely illustrative purposes and do not limit, in any case, the scope of the invention.

EXAMPLE 1

Part (A)

10% by weight of the required amount of the polymerization initiator (azobis-isobutyronitrile, dissolved in toluene) was introduced into a glass reactor having a capacity of 2 liters, equipped with stirrer, thermometer, reflux condenser, openings for the continuous feed of monomers and catalysts, thermostating jacket, openings for withdrawing samples and bottom discharge device. The diluent (toluene) was also introduced at the start, in order to form a liquid head.

A mixture of the 2 monomers, corresponding to 196 parts by weight of maleic anhydride and 172 parts by weight of vinyl acetate, was prepared apart. After having heated the liquid head (at 90 C), the (continuous) feed was started of the residual part of the catalyst and of the preformed mixture of monomers, under vigorous stirring. The polymerization reaction started immediately and the polymer separated in the form of solid particles in toluenic suspension. In consequence of the reaction heat, the temperature increased up to 110° C.; at this point the diluent reflux started. The (continuous) feed was completed in 1 h and the reactor was kept under reflux for one more hour, in order to minimize the content of free monomer; the total amount of the used initiator corresponded to 1% by weight of the sum of the monomers. After cooling, the suspension of the solid in the solvent (25% by weight) was discharged. The free monomer content corresponded to a conversion of about 98,4%; one withdrew from the suspension a separated portion, which was used in part (B) of the example. The determination of the molecular weight of the copolymer was carried out on another sample, by using GPC (gel permeation chromatography); the weight average molecular weight (Mw) of the copolymer was 16300 and the number average molecular weight (Mn) was 6000.

Part (B)

700 g of a toluenic suspension, at 25% by weight of solid copolymer, coming from Part (A), were loaded into a glass lined reactor, having a capacity of 2 liters, equipped with stirrer and reflux condenser. After heating at 80° C., under stirring, 341.6 g of deionized water were added in a continuous way, by heating as to keep the liquid-vapor equilibrium at the azeotropic level of the water-toluene system (84.1 C, at atmospheric pressure). 30 minutes after the start of the water addition, the copolymer proved to be completely extracted from the toluenic phase (and displaced to the aqueous phase) and the formation of the acid solution was noted, due to the opening of the CO-O-OC group of the maleic anhydride units. The separation of the phases, after the stop of the stirrer, was instantaneous. The overfloating organic phase, perfectly clear, was unloaded; the last traces of residual toluene were completely removed from the aqueous phase by an azeotropic distillation (under vacuum). After neutralization with aqueous soda (48% by weight), in an amount equivalent to 80% of the present acid groups, one obtained an aqueous solution (at pH 7) of a partially salified copolymer, at a concentration of 43% by weight; one thus recovered 534.6 g of a solution containing 229.9 g of solids, which corresponded to a yield of 100%.

EXAMPLE 2 (TEST WITH AN ACRYLIC TERMONOMER)

Part (A)

Example 1 (Part A) was repeated, by feeding to the reactor, in a continuous way, 40.5 g of acrylic acid (11% by weight, with respect to the maleic anhydride+vinyl acetate adduct) as well. After 2 h (from the start of the feed) and after one more hour (under reflux), which was necessary to complete the reaction, a suspension was discharged, containing about 25% of solids. The dermination of the molecular weight was carried out on a sample of dry copolymer by GPC (Mw=48,000; Mn=12,800).

Part (B)

750 g of the copolymer suspension coming from aforesaid Part (A) were introduced into the same apparatus of example 1 (Part B). The extraction of the polymer with water, from the toluenic phase, was carried out following the same operative conditions. After neutralization with aqueous NaOH (at 48% by weight) one obtained 567.6 g of a solution of salified polymer, which corresponded to a purity of 42%, with a recovery yield of 100%.

EXAMPLE 3 (CONTINUOUS TEST)

Part (A)

The test of this example was carried out in a plant comprising an apparatus for the continuous premixing of maleic anhydride and vinyl acetate, metering pumps, a container for the catalyst solution and a stirred reactor (lined and with automatic discharge device). 1290 g/h were fed (in a continuous way) of a solution containing 15.2% by weight of maleic anhydride and 13.3% of vinyl acetate, as well as a solution of azobisisobutyronitrile in toluene, so that the feed amount corresponded to 1% by weight on the sum of the monomers. In the starting phase the reactor was heated at 110° C., by means of a thermal fluid circulating through the jacket; afterwards the polymerization heat was removed by reflux evaporation of toluene. The residence time (of the monomers) was about 5 hours. The copolymer suspension was unloaded in a continuous way and stored up for the subsequent recovery of the copolymer. The weight average molecular weight (Mw), determined according to the GPC technique, was 15,800 and the number average molecular weight (Mn) was 5600.

Part (B)

Following FIG. 1, suspension (6) at 25%, produced in copolymerization reactor (R), after having been stored up and preheated, was fed, in a continuous way, (flow rate=1100 g/h) to the mixing tank (D3), equipped with a stirrer and a heating jacket, along with a (preheated) stream of deionized water (7) (flow rate=500 g/h); the temperature was kept around 100° C. (under autogenous pressure) and the residence time was about 90 minutes.

The system (8) was transferred (in a continuous way, through an overflow) to tank (E), where the separation of the phases took place. The organic phase (9) (clear, consisting of toluene) was recycled, in a continuous way, to tank (D1); the aqueous phase (10), containing the acid copolymer saturated with toluene, was fed to an azeotropic distillation column, which is not indicated in the figure, and then to the neutralization apparatus (N), along with a stream (11) of aqueous NaOH (at 48% b.w.). One thus obtained 815 g/h of an aqueous solution (12), containing 43.5% by weight of salified copolymer, corresponding to a recovery yield of 100%.

EXAMPLE 4 (COMPARATIVE EXAMPLE)

Example 1 was repeated, changing the ratio between the two comonomers, in order to have 2 moles of maleic anhydride per 1 mole of vinyl acetate. The mixture of the two monomers (prepared separately) comprised 263 parts by weight of maleic anhydride and 114 parts by weight of vinyl acetate. A share part of toluene was introduced as a liquid head onto the bottom of the reactor, along with 10% of the initiatior (AZOBIS-ISOBUTYRONITRILE). After having heated this liquid head at 90° C., one started the continuous feed of the preformed mixture of the monomers and of the residual part of the initiator, under vigorous stirring. The polymerization started after a few minutes and the polymer separated in the form of solid particles in a toluenic suspension. The temperature increased up to 100° C. (under reflux) as a consequence of the polymerization heat. The continuous feed was completed in 2 hours and the reactor was kept at 110° C. for one more hour. At the beginning of this period also a further part (10%) of initiator was added, in order to minimize the amount of free monomer; the overall amount of initiator corresponded to 1.1% by weight of the sum of the 2 monomers. After cooling, the suspension of solids in the solvent, at a concentration of about 21% by weight, was unloaded. The content in free monomer corresponded to a conversion of about 70%, calculated on the feed of maleic anhydride; such content (free monomer) was excessive for any further operation and for the use both in the field of detergency and for the treatment of waters. Part of the suspension was withdrawn and treated, according to Part (B) of example 1, with 350 g of deionized water. The polymer was thus recovered as an aqueous solution, which after the operation of neutralization with NaOH at 48% (in amount equivalent to 80% of the acid groups) gave rise, by cooling, to a turbidity formation, due to the precipitation of monosodium maleate, which is not soluble in the system. All this was in contrast with the solution obtained according to Part (B) of example 1, which remained clear for a long time, even at low temperatures. Data and results are set forth in Table 1.

EXAMPLE 5 (EXPLOITATION TESTS)

The copolymers (in an aqueous solution, neturalized with sodium hydroxyde), obtained according to the preceding examples, showed the following characteristic:

TABLE 1

| EX. | VA/MA (**) | PURITY (%) | RECOVERY YIELD (%) | VISCOSITY (mPa · s) | COLOR | CALCIUM BINDING CAPACITY (*) |
|---|---|---|---|---|---|---|
| 1 | 1 | 43 | 100 | 470 | light yellow | 770 |
| 2 | 1 | 42 | 100 | 550 | light yellow | 750 |
| 3 | 1 | 43.5 | 100 | 500 | light yellow | 725 |
| 4*** | 0.5 | <40 | <70 | 300 | light yellow | 685 |

(*) mg of CaCO$_3$ per gram of dry copolymer
(**) by moles
(***) comparative example By operating according to examples 1-3, one obtained, in a simple way and with one operation (namely without any solid separation and drying) quantitative yields; the thus obtained aqueous solutions had a calcium binding capacity much higher than the solutions of copolymers containing recurring vinyl alcohol units instead of vinyl acetate units. Said copolymers were used in washing tests carried out in a washing-machine, by using the following formulation, containing 4A zeolite, as the builder, and said copolymers as co-builders.

| | |
|---|---|
| ALKYLBENZENE-SULFONATE (SODIUM SALT) | 7.0% |
| C$_{13}$-C$_{15}$ ALCOHOL, ETHOXYLATED WITH 11 MOLES OF EO | 5.0% |
| SOAP | 2.0 |
| 4A ZEOLITE | 27.5% |
| SODIUM CARBONATE | 9.0% |
| CMC (AS SUCH) | 0.5% |
| PROTEOLITIC ENZYME | 0.4% |
| COPOLYMER (AS FROM EXAMPLE 3) | 4.0% |
| SODIUM SULFATE | 16.8% |
| SODIUM PERBORATE (TETRAHYDRATE) | 20.0% |
| TETRA ACETYL - ETHYLENEDIAMINE (TAED) | 2.0% |
| SODIUM DISILICATE | 3.0% |
| WATER | 2.8% |

Washing tests were carried out at 60° and 90° C., measuring the washing effect and the amount of incrustations on the fabrics after 5-10-15 consecutive washing cycles. Moreover one prepared a comparative formulation, in which an equal amount of sodium tripolyphosphate was introduced instead of the zeolite and of the copolymer; the washing tests were carried out in a washing-machine, at 60° and 90° C., with said formulation, measuring the washing effect and the amount of incrustations on the fabrics. Both the whiteness index, on the different kinds of standard soil, and the ash content, after the series of the indicated washing cycles, were of the same order for both formulations and anyhow such as not to discriminate a copolymer either with respect to another copolymer or with respect to TPF (tripolyphosphate).

EXAMPLE 6

The anti-scaling effect of the copolymers, obtained according to example 1-3, was checked in a laboratory experimental apparatus, by means of turbidimetric measures and on the basis of the shape and size of the crystals. The effect of inhibition of the precipitation and of the possible deposition of solids in a non-scaling form was compared with the effect of a water having the same degree of hardness, which did not contain any copolymer. A similar test is described in U.S. Pat. No. 2,723,956. The concentrations of copolymer ranged from 1 to 10 ppm. In the case of a continuous running, by working with water containing the copolymers under examination, neither increase in the turbidity nor deposition of scale was noted, contrary to the tests carried out with waters which did not contain any copolymer.

What we claim is:

1. A process for the manufacture of aqueous solutions comprising polymerizing a first monomer of maleic anhydride, a vinyl acetate second monomer, and a third monomer to form a terpolymer, said third monomer being selected from the group consisting of:

acrylic and/or methacrylic acid, and corresponding methyl, ethyl, butyl and hydroxyethyl esters;
itaconic acid; and
methylvinylether;

wherein the monomers are polymerized in an anhydrous reaction medium, having medium or low polarity, reactively extracting the thus obtained anhydrous suspension with water thereby forming an organic phase, wherein:

the amount of vinyl acetate fed to the polymerization is from 40 to 70% by moles, on the overall sum of the monomers, the amount of maleic anhydride is from 30 to 50% by moles, on the sum, the amount of the third monomer is from 1 to 10% by moles, on the sum, the molar ratio vinyl acetate/maleic anhydride being equal to or greater than 1; and recycling the organic phase resulting from the extraction to a polymerization zone.

2. A process according to claim 1, wherein the amount of water, to be used for the reactive extraction, ranges from 75 to 500 kg per 100 kg of pure terpolymer.

3. A process according to claim 1, wherein the extraction temperature ranges from room temperature to 120° C.

4. The process according to claim 3, wherein the temperature ranges from 60° to 120° C. under pressure.

5. A process according to claim 1, wherein said diluent is selected from among the group consisting of:
 (A) aromatic solvent, optionally halogenated;
 (B) cycloaliphatic solvent and mixtures thereof with the aromatic solvent of step (i); and
 (C) halogenated aliphatic solvent.

6. The process according to claim 5, wherein the aromatic solvent is selected from the group consisting of benzene, toluene, ethylbenzene and mono-chlorobenzene.

7. The process according to claim 6, wherein the cycloaliphatic solvent is selected from the group consisting of cyclohexane and mixtures thereof with benzene, toluene, ethylbenzene and mono-chlorobenzene optionally halogenated.

8. The process according to claim 5, wherein the halogenated aliphatic solvent is selected from the group consisting of chloroform, dichloroethane, carbon tetrachloride, perchloroethylene and methylene chloride.

9. The process according to claim 1, wherein the amount of vinyl acetate ranges from 45 to 65% by moles.

10. The process according to claim 1, wherein said monomers are made to polymerize in the presence of a protective colloid.

11. An aqueous solution comprising a copolymer of maleic anhydride with vinyl acetate and a third monomer, manufactured according to the process of claim 1, having a viscosity equal to or lower than 2000 mPa.s and containing from 40 to 50% by weight of copolymer, the weight average molecular weight of said copolymer being:
 from 1,000 to 35,000, when the amount of the third monomer is 0%; and
 from 5,000 to 60,000, when the amount of the third monomer is different from 0%.

12. A process for the manufacture of aqueous solutions comprising polymerizing a first monomer of maleic anhydride, a vinyl acetate second monomer, and a third monomer to form a terpolymer, said third monomer being selected from the group consisting of:
 acrylic and/or methacrylic acid, and corresponding methyl, ethyl, butyl and hydroxyethyl esters;
 itaconic acid; and
 methylvinylether;
wherein the monomers are polymerized in an anhydrous reaction medium, having medium or low polarity reactively extracting, the thus obtained anhydrous suspension with water thereby forming an aqueous phase and an organic phase, wherein:
 the amount of vinyl acetate fed to the polymerization is from 40 to 70% by moles, on the overall sum of the monomers, the amount of maleic anhydride is from 30 to 50% by moles, on the sum, the amount of the third monomer is from 1 to 10% by moles, on the sum, the molar ratio vinyl acetate/maleic anhydride being equal to or greater than 1,
recycling the organic phase resulting from the extraction to a polymerization zone; and
subjecting the aqueous phase, containing traces of residual diluent, to an azeotropic distillation and then an optional neutralization with a base.

13. The process according to claim 12, wherein the amount of vinyl acetate ranges from 45 to 65% by moles.

14. The process according to claim 12, wherein the base is NaOH.

15. A process for the manufacture of aqueous solutions comprising polymerizing a first monomer of maleic anhydride, a vinyl acetate second monomer, and a third monomer to form a terpolymer, said third monomer being selected from the group consisting of:
 acrylic and/or methacrylic acid, and corresponding methyl, ethyl, butyl and hydroxyethyl esters;
 itaconic acid; and
 methylvinylether;
wherein the monomers are polymerized in an anhydrous reaction medium, having medium or low polarity, reactively extracting the thus obtained anhydrous suspension with water, thereby forming an organic phase and an aqueous phase, wherein:
 the amount of vinyl acetate fed to the polymerization is from 40 to 70%, by moles on the overall sum of the monomers, the amount of maleic anhydride is from 30 to 50% by moles, on the sum, the amount of the third monomer is from 1 to 10% by moles, on the sum, the molar ratio vinyl acetate/maleic anhydride being equal to or greater than 1;
recycling the organic phase resulting from the extraction to a polymerization zone;
neutralizing with a base the aqueous phase, containing traces of residual diluent; and
removing by vacuum evaporation said traces of residual diluent, before or during neutralization.

16. The process according to claim 15, wherein the amount of vinyl acetate ranges from 45 to 65% by moles.

17. The process according to claim 15, wherein the base is NaOH.

* * * * *